United States Patent [19]

Sunouchi et al.

[11] 4,165,933
[45] Aug. 28, 1979

[54] SINGLE LENS REFLEX CAMERA REMOVABLE VIEW FINDER

[75] Inventors: Akio Sunouchi, Tokyo; Yoshiaki Watanabe, Fujisawa, both of Japan

[73] Assignee: Canon Kabushiki Kaishha, Tokyo, Japan

[21] Appl. No.: 837,013

[22] Filed: Sep. 27, 1977

[30] Foreign Application Priority Data

Oct. 1, 1976 [JP] Japan .................... 51-118337

[51] Int. Cl.² .................... G03B 13/06; G03B 17/24; G03B 19/12

[52] U.S. Cl. .................... 354/106; 354/152; 354/219

[58] Field of Search ............ 354/105, 106, 109, 129, 354/147, 219, 288, 60 R, 152

[56] References Cited

U.S. PATENT DOCUMENTS

| | | | |
|---|---|---|---|
| 3,670,639 | 6/1972 | Harnden, Jr. ............ | 354/60 R X |
| 3,868,711 | 2/1975 | Sekida et al. ............ | 354/219 |
| 3,967,299 | 6/1976 | Shono ............ | 354/219 |
| 4,001,850 | 1/1977 | Fujita ............ | 354/219 |
| 4,062,024 | 12/1977 | Tsunekawa et al. ............ | 354/288 X |
| 4,062,026 | 12/1977 | Fujita ............ | 354/106 |
| 4,101,912 | 7/1978 | Watanabe et al. ............ | 354/219 X |

Primary Examiner—Michael L. Gellner
Attorney, Agent, or Firm—Toren, McGeady and Stanger

[57] ABSTRACT

A single lens reflex camera or a camera system uses a camera body unit and has a view finder unit permanently fixed to or detachably mounted on the camera body. A first terminal on the camera body is electrically connected with a synchronous device which is so arranged as to provide a synchronous signal related to the operation of a shutter device, while a second terminal which can contact with or can be coupled to the first terminal on said camera body when the view finder unit is attached to the camera body unit, is provided on the view finder unit. Therefore one or more electrical devices, which are built in the view finder unit or are detachably mounted on the view finder unit and require the synchronous signal related to the operation of the shutter device for having themselves activated, are electrically connected to the synchronous means through the contacting or coupling of the second terminal with the first terminal. A latch holds the view finder in position and aligns it with the camera body.

16 Claims, 6 Drawing Figures

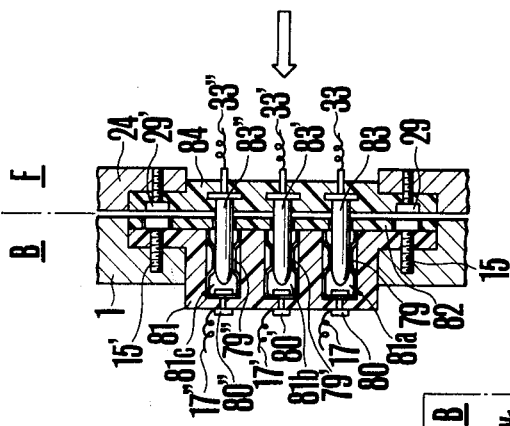
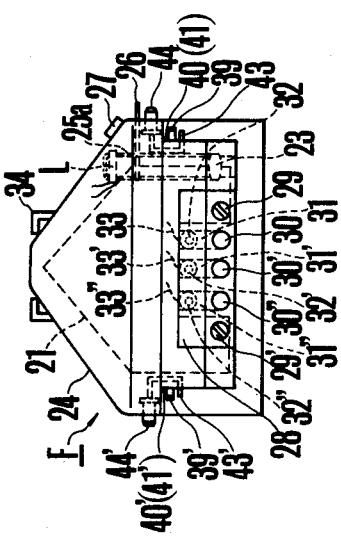
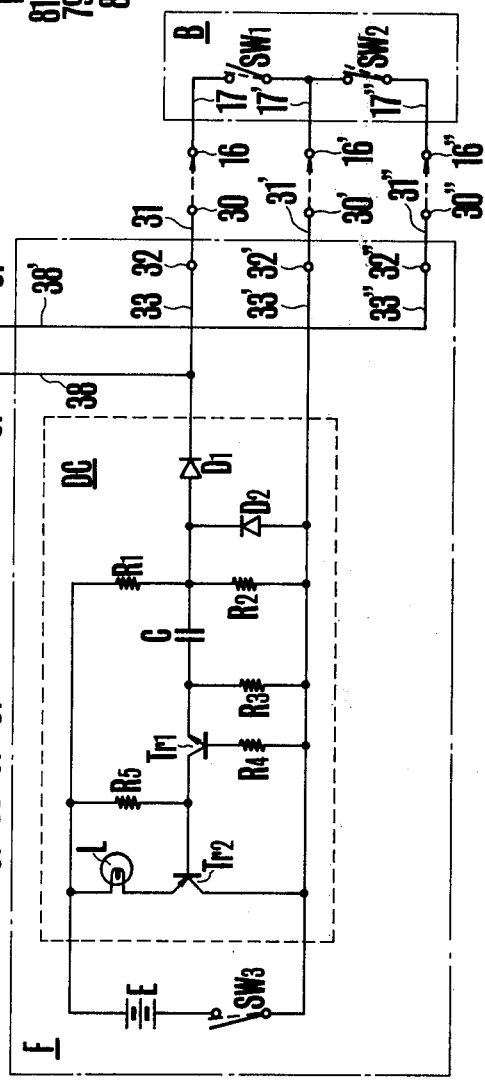

SINGLE LENS REFLEX CAMERA REMOVABLE VIEW FINDER

BACKGROUND OF THE INVENTION

1. Field of the Invention

The present invention relates to a single lens reflex camera or a camera system and particularly to a single lens reflex camera or a camera system comprising in combination a camera main body and a view finder unit formed as a unit against said camera main body.

Said view finder unit formed as a unit means not only those made as an exchangeable adapter unit which can be attached to and detached from a camera main body as desired for systemization of a camera, but also those assembled beforehand as a unit against a camera main body to increase the efficiency of a camera assembly operation and fixedly provided on the camera main body during a final assembly stage or in a course of the camera assembly operation.

2. Description of the Prior Art

A single lens reflex camera having for example a mounting means, such as an accessory shoe to permit the mounting of a device such as a flash lamp, requiring an electrical signal related to the operation of a shutter device as a synchronous signal for actuating the device, where such accessory shoe is provided at a view finder unit part has been known well heretofore.

On the other hand, nowadays, due to the limited space available within a camera main body, when an additional device such as a data photo-taking device, etc. for example is provided with the camera, the device is built into the view finder unit part and an electrical signal related to operation of the shutter device is used as a synchronous signal for having the actuation of the device controlled in order to simplify the control over its operation.

And in a single lens reflex camera provided with a device having its actuation controlled by an electrical signal related to the operation of the shutter device as mentioned above, and/or a means to mount said device, provided at its view finder unit, when said view finder unit is to be made in the form of a unit independent of a camera main body, that is when the view finder is to be made beforehand as a unit to be later connected against the camera main body for better efficiency of camera assembly operation, or where the view finder unit part is to be made as an exchangeable type adapter unit which can be attached to and detached from the camera main body for systemizing a camera, it will be necessary to give special considerations for a form of electrical connections between said camera main body and the view finder unit.

That is, for example, even when the view finder is made beforehand in the form of unit to be later connected against the camera main body for better efficiency in the camera assembly operation as in the former case, if the electrical connection between said view finder part and the camera main body is done by lead wires etc. as has been done in conventional cameras, the connection of said lead wires is quite a complicated operation, thus impairing the advantages in efficiency in the camera assembly operation obtained by forming the view finder part as a unit.

On the other hand, when the view finder unit body is made as an exchangeable type adapter unit which can be freely attached to and detached from the camera main body for systemization of the camera as in the latter case, is provided separately connecting cord or cable, etc. for electrically connecting a synchronous switch (which is so arranged as to provide a synchronous signal related to the operation of the shutter device) at the camera main body and the view finder adapter unit or above mentioned device provided at said view finder adapter unit may be used. The disadvantages of making the connections in this way are, however, that said connecting cords or cables are apt to constitute obstacles in handling the camera, and that said cords or cables are apt to be inadvertently dislocated during the preparation for taking a photograph, making the above mentioned device provided at the view finder adapter unit totally inoperative.

SUMMARY OF THE INVENTION

The present invention has has for its prime object to provide a simple way of electrically connecting the main camera body to a device requiring an electrical signal related to the operation of the shutter device in the camera main body for activation of the device and/or to provide a means to mount said device.

Another object of the present invention is to provide a unique and practically useful electrical connection in a single lens reflex camera system that is systematically made or in a single lens reflex camera in which a view finder unit part is prepared as an accessory adapter unit which can be freely attached to or detached from a camera body unit, the electrical connection between said camera main body and said view finder adapter unit being achieved simply by attaching the view finder adapter unit to the camera body unit without requiring a separate means such as connecting cords or cables, etc.

Further another object of the present invention is to provide a practical electrical connection apparatus is suitable, for example for forming an electrical connection between a camera body of a single lens reflex camera and a view finder unit in such single lens reflex camera, said view finder unit part being made beforehand and is fixed to the camera body in a final stage or in a course of an assembly process of the camera. The connection can be always achieved by simply attaching the view finder unit part to the camera body for assembling the camera without requiring any complicated wiring connection between said camera body and the view finder unit part which might impair such advantages in efficiency in a camera assembling operation as obtained by providing the view finder as a unit.

And to achieve said objects the present invention provides such a unique set up of a single lens reflex camera or a camera system that said camera or camera system comprises a camera body unit and a view finder unit which is permanently fixed to said camera body or detachably mounted on said camera body, wherein a first terminal electrically connected with synchronous means which is so arranged as to provide a synchronous signal related to the operation of a shutter device, is provided at a camera body unit, while a second terminal means, which can be contacted or coupled with said first terminal means at said camera body unit when said view finder unit is attached to the camera body unit, is provided at the view finder unit. Therefore one or more electric devices which are built in said view finder unit or are mounted thereon in a demountable manner and require said synchronous signal related to the operation of the shutter device for activating itself, are electrically connected to said synchronous means through said contacting or coupling of the second terminal means with the first terminal means.

Further other objects and characterizing features of the present invention will be made clear from the descriptive explanations given below in reference to the attached drawings on examples.

BRIEF DESCRIPTION OF THE DRAWINGS

Now examples of the present invention will be explained referring to the drawings attached, which show examples of the present invention where a view finder unit body is made as an exchangeable type adapter unit which can be freely attached to and detached from a camera main body.

FIG. 4 is an external view of the view finder unit as viewed from a position in front of the same as it is removed from the camera main body.

FIG. 5 is an electrical circuit diagram showing a form of electrical connections among the camera main body, the view finder unit, and a flash light device and details of a set up of a data photo-taking circuit in a data photo-taking device built in the view finder unit.

FIG. 6 is an enlarged oblique view showing important parts of another example of the means for providing an electrical connection between the camera main body and the view finder unit.

DETAILED DESCRIPTION OF THE PREFERRED EMBODIMENT

Now, explanations will be made on a case when a view finder unit is made as an exchangeable adapter unit which can be mounted on and demounted from a camera main body as desired, as an example of the present invention.

Figure 1:
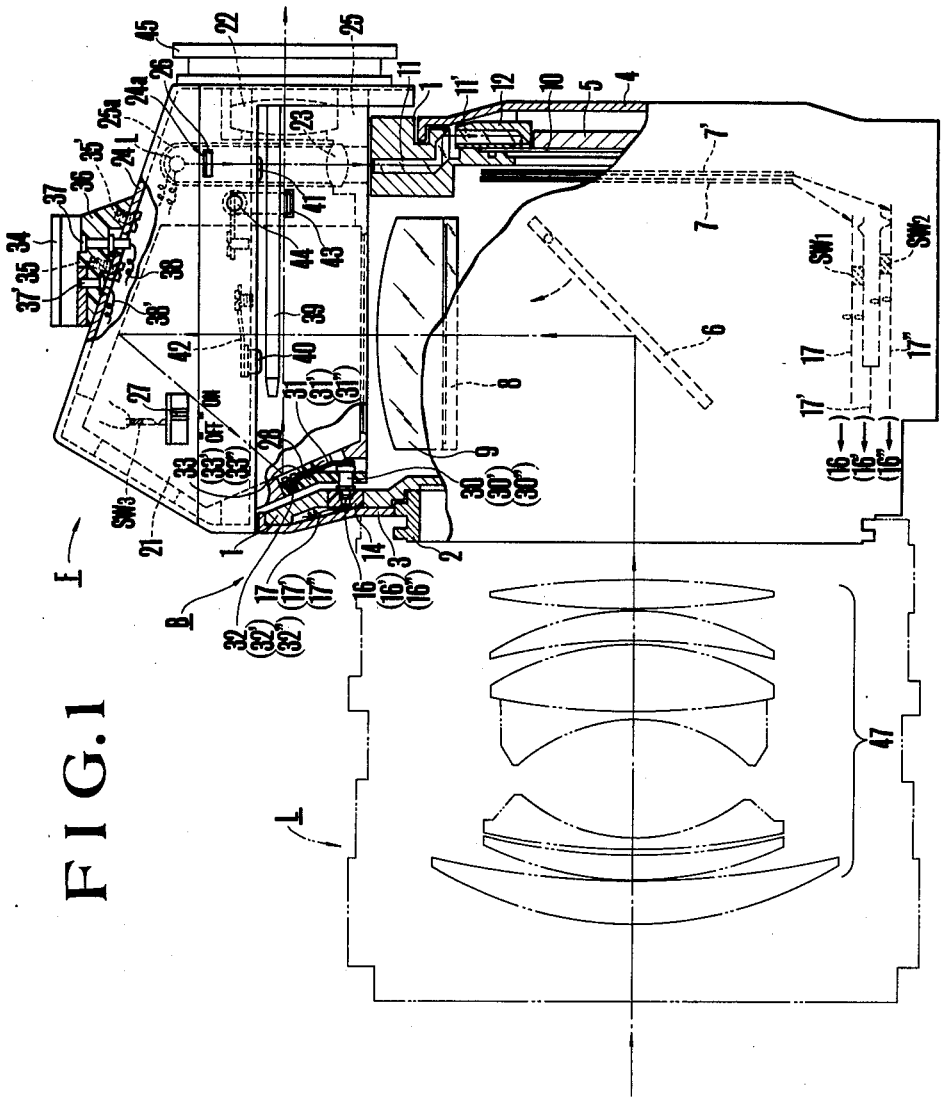
FIG. 1 is a partially sectional diagram to show the important parts of the camera main body and the view finder unit in a state wherein said view finder unit part is attached to the camera main body.
Figure 2:
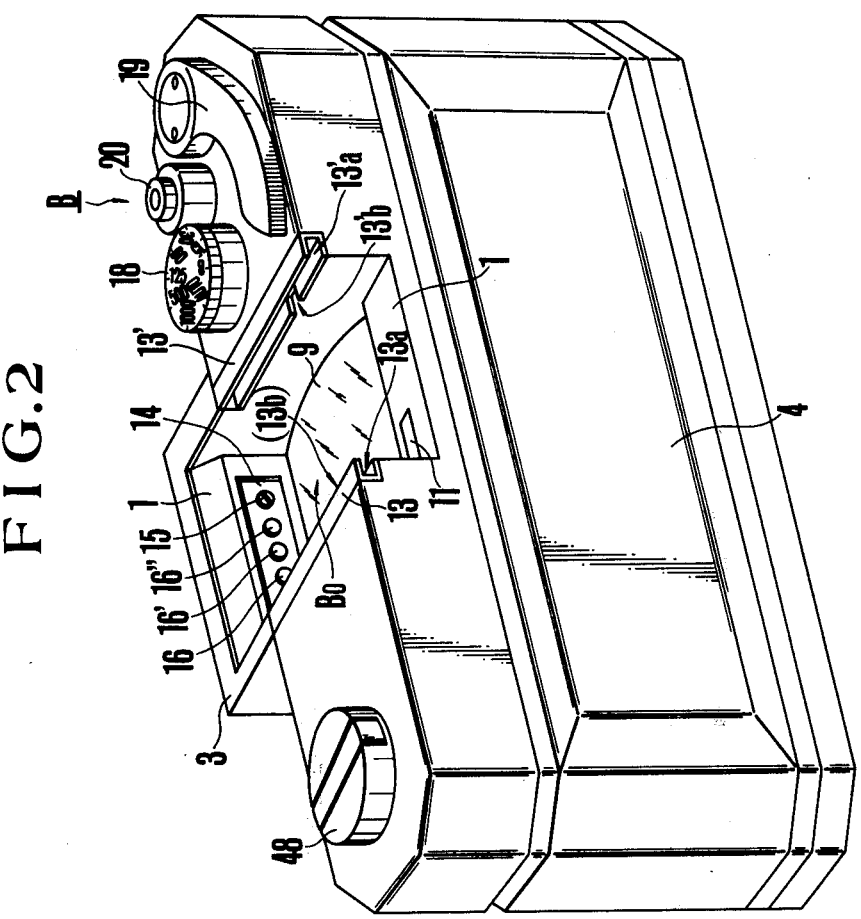
FIG. 2 is an oblique view to show the external appearance of important parts in the camera body unit, being particularly related to the present invention in a state wherein the view finder unit part is removed.

First in FIGS. 1, 2 and 4, B is a main body of a single lens reflex camera, while F shows a view finder made as a unit and abutting said camera main body B.

First, in the camera main body B, 1 is a camera frame, 2 is a lens mount part attached to said camera frame 1 for mounting a photo-taking lens, and an exchangeable photo-taking lens unit L is mounted on said lens mount part 2 as shown by imaginary lines in FIG. 1. Also, 47 is an optical system in said lens unit L.

What is shown as 3 is a front cover of the camera main body, 4 is a rear cover, and 5 is a film pressure plate attached to said rear cover 5, while 6 is a known type of movable mirror of a single lens reflex camera, the mirror being shifted in response to the operation of a shutter release from the position shown in FIG. 1 to a retracted position outside of the photo-taking optical path for exposure of a film. What are shown as 7 and 7' are a first curtain and a second curtain of a known type of focal plane shutter, and 8 is a focusing screen, while 9 is a condenser lens. What is shown as 10 is a film, and 11 and 11' are light guide members to guide a data light beam from a data photo-taking device (details of which will be described later), which is built into the finder unit F and is activated based on a signal related to the operation of the shutter of the camera main body B, past a location behind said film 10 and then onto the film 10, wherein the light guide member 11 is retained at a prescribed position of the camera frame 1 and the light guide member 11' is also retained at a prescribed position by a retaining member attached to the camera frame 1.

What are shown as 13, 13' (shown in FIG. 2) are left and right guide members to guide said finder unit F as said finder unit F is mounted on the camera main body B, and guide grooves 13a, 13'a and notched parts 13b, 13'b are provided therein.

An insulating plate 14 is fixed at a part of the camera frame 1 by a screw 15 within a recess part $B_O$ which is formed at an upper central part of the camera main body B for mounting the finder unit F, and three connecting terminals 16, 16' and 16" are affixed to said insulating plate 14 in such a manner that their heads protrude inside of said recessed part $B_O$.

What is shown as SW1 (shown in FIGS. 1, 3 and 5) is a known type of synchronous signal generating switch being normally opened, which is provided at an appropriate place on the camera main body B in such a manner that it is closed near the end point of the running of said first shutter curtain 7 to provide such electrical timing signals related to an operation of the shutter, and is connected to terminals 16, 16' through connecting wires 17, 17'. Also, what is shown as SW2 is a normally closed switch provided at an appropriate place on the camera main body B in such a manner that it is opened near the end point of the running of the shutter second curtain 7', and is connected in series with said switch SW1 and at the same time is connected to the terminal 16" through the connecting wire 17".

Also in FIG. 2, as 18 is a shutter speed setting dial, and 19 is a film wind up and shutter charge lever, while 20 is a release button, and 48 is a film rewinding operation knob.

Figure 3:
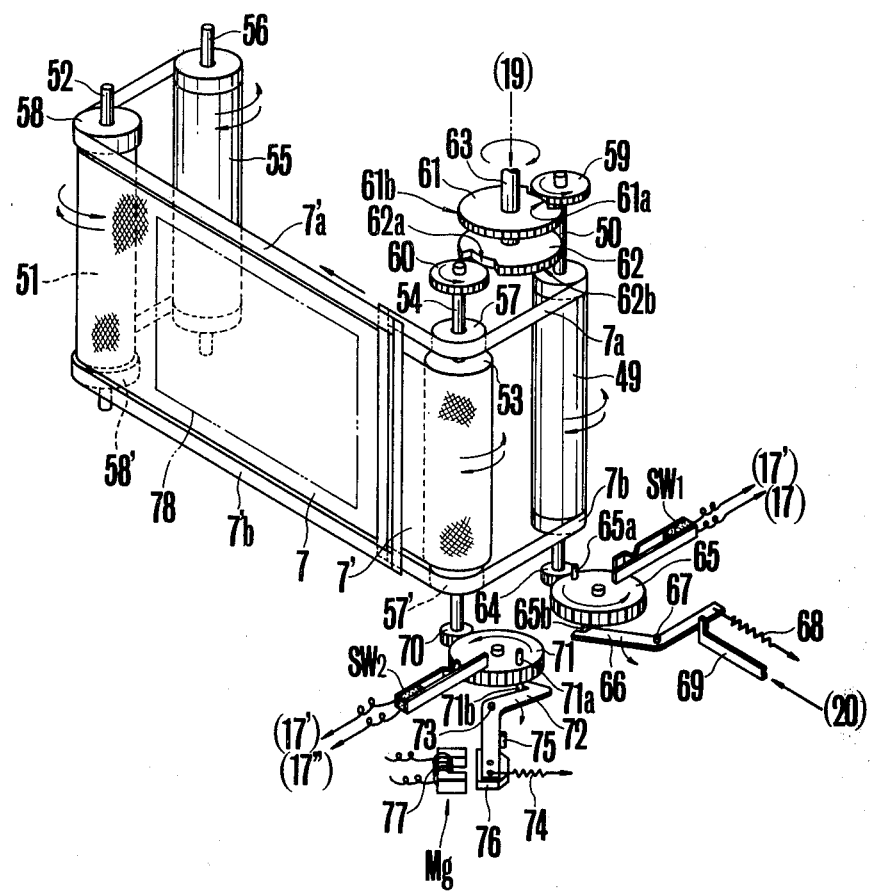
FIG. 3 is an oblique view of the important camera parts to show details of the relationship between a shutter device provided at the camera main body and a synchronous switch used for providing electric signals that are related to the operation of said shutter device.

Details of the relationship between said synchronous switch SW1 and the switch SW2 and a shutter device are shown in FIG. 3.

A rotating drum 49 for a leader screen is attached to an axle 50 axially attached to an appropriate place on the camera main body in a freely rotatable manner, wherein forward end parts of two ribbons 7a, 7b connected to said first curtain 7 are wound around an external circumference of said drum. A spring drum 51 for a first curtain 7, is axially supported by an axle 52 fixedly provided at an appropriate part of the camera main body in a freely rotatable manner, and a spring to run said first curtain 7 is provided within said spring drum and a forward end part of said first curtain 7 is wound around an external circumference of the same.

A rotating drum 53 for the second curtain 7' is held in place by an axle 54 axially provided on an appropriate place of the camera main body in a freely rotatable manner, and a forward end part of said second curtain 7' is wound around an outer circumference of the same.

A spring drum 55 for the second curtain 7' is axially supported by an axle 56 fixedly provided at an appropriate place of the camera main body, and a spring to run the second curtain 7' is provided within the same, wherein forward ends of two ribbons 7'a, 7'b coupled to said second curtain 7' are wound around an outer circumference of said drum 55.

Guide rollers 57, 57' to guide the running of said ribbons 7a, 7b and are axially supported by said rotating axle 54 for the second curtain 7'. Guide rollers 58, 58' to guide the running of said ribbons 7'a, 7'b, and are axially supported by said supporting axle 52 for the spring drum 51 for the first curtain 7 in a freely rotatable manner. Shutter charging gears 61, 62 are output members of a shutter charging mechanism driven by said lever 19, the gears having toothless parts 61a, 62a and toothed parts 61b, 62b respectively, and being attached to a rotating axle 63 coupled to a one-way clutch mechanism, not shown in the drawing. In operation, gears 61 and 62 rotate twice a gear 59 attached to the rotating axle 50 for the first curtain 7 and a gear 60 attached to the rotating axle 54 for the second curtain 7' in to a counter-clockwise direction with the toothed parts 61b, 62b thereof when the same is rotated one time in a clockwise direction by the operation of the lever 19 (therefore rotating the rotating drums 49 and 53) for setting the first curtain 7 and the second curtain 7' at an initial position. (That is, here the drums 49, 51 and 53, 55 are so designed as making two rotations at a time when the first curtain 7 and the second curtain 7' run. Also, the spring drums 51, 55 also make two rotations to counter-clockwise direction around the axles 52, 55 respectively at a time of shutter charging, and then the spring provided within each one of the same is charged).

A gear 65 is engaged with a gear 64 attached to said rotating axle 50 for the first curtain 7, and has its diameter and number of gear teeth so determined as making almost ¾ rotations for each two rotations of said gear 64 (therefore of the rotating drum 49 for the first curtain 7).

A first curtain checking lever 66 engages a pin 65b affixed to the lower surface of said gear 65 as the shutter charging is completed and checks said gear 65 (therefore the rotating drum 49 for the first curtain 7) at a shutter charging position against the biasing power of the spring within the spring drum 51, wherein said lever 66 is axially supported by an axle 67 in a freely rotatable manner and at the same time it is biased in a clockwise direction around said axle 67 by a spring 68, that is in a direction engaging with said pin 65b.

A release member 69 is associated with said release button 20, and slides in the direction of an arrow in the drawing in response to a pressing down of the release button 20, and then releases the checking of the gear 65 by said checking lever 66 by rotating the checking lever 66 in a counterclockwise direction against the biasing power of said spring 68.

A gear 71 is engaged with a gear 70 attached to said rotating axle 54 for the second curtain 7', and has its diameter and number of gears so determined to make about ¾ rotations for each two rotations of the gear 70 (that is of the rotating drum 53 for the second curtain).

A second curtain checking lever 72 engages with a pin 71b affixed a lower surface of the gear 71 as a shutter charging is completed and checks said gear 71 (that is the rotating drum 53 for the second curtain 7') at a shutter charging position against the biasing power of the spring within the spring drum 55, wherein said lever 72 is axially supported by an axle 73 in a freely rotatable manner and at the same time is biased in a counter-clockwise direction around said axle 73 by a spring 74, that is, in the direction of engagement with the pin 71b.

Also, a fixed pin 75 restricts the rotation of said lever 72 in a counter-clockwise direction.

An electro-magnet Mg starts the second curtain 7' and is controlled by a known type of a shutter control circuit, not shown in the drawing, and rotates said lever 72 in a clockwise direction against the biasing power of the spring 74 by attracting an armature 76 attached to an end of said lever 72 as power is supplied to a coil 77 thereof by said shutter control circuit. Thus the above mentioned checking of said gear 71 by the lever 72 is released. Also, what is shown as 78 is an aperture for photo-taking.

In the above described shutter device, first the synchronous switch SW1 is closed when said gear 65 makes about ¾ rotations from a position shown in the drawing in the counter-clockwise direction by a pin 65a affixed to the upper surface of the above mentioned gear 65 associated with the rotating drum 49 for the first curtain 7 at a time of shutter release, that is, around a point where the first curtain 7 completes its running. Also, the switch SW2 is opened at a time when the gear 71 makes about ¾ rotations from the position shown in the drawing in a counterclockwise direction by a pin 71a affixed to an upper surface of said gear 71 associated with the rotating drum 53 for the second curtain 7' when the shutter closes, that is, at a time where the second curtain 7' completes its running.

Next, in the finder unit F, 21 is a known type of pentagonal dach prism, and 22 is an ocular lens, while L is a lamp for photo-taking data that is turned on and off under the control of a data photo-taking circuit DC (shown in FIG. 5), and what is shown as 23 is an imaging lens for data photo-taking, wherein said components are all housed in the finder housing 24, and the prism 21 and the lenses 22, 23 are fixedly retained at a prescribed position within the housing 24 by the optical system retaining frame 25.

Also, said lamp L and the imaging lens 23 constituting the data photo-taking device have their optical positions so adjusted that the data luminous flux obtained by the lamp L and the lens 23 when the finder unit F is properly mounted on the recessed part $B_O$ of the camera main body B are irradiated onto the film 10 through the light guide members 11, 11' at the camera main body B from the rear of the camera and data images are properly imaged on said film 10, and as much light shielding as possible is provided by a light shielding tube 25a attached to said retaining frame 25 so that the film 10 is not exposed by the light beam emitted from the prism 21 or an external light beam such as inverse incident light beam from the ocular lens 22.

An opening 24a for inserting a data sheet 26 is formed at a part of a side plane of the housing 24, wherein when data is being photographed, a data sheet 26 which has data to be photographed recorded thereon is inserted through said opening 24a so that said sheet 26 can be set at a prescribed position within an optical path connecting the lamp L and the imaging lens 23.

An operating knob 27 operates the main switch SW3 connected to said data photo-taking circuit DC from the outside of the finder housing 24, wherein said knob 27 is located at a part of a side plane of the housing 24 and can be selectively set to either the "ON" or "OFF" positions at said side surface.

An insulating plate 28 is fixed at a lower part of a front plane of said frame 25 by screws 29, 29' (shown in FIG. 4), and three connecting terminals 30, 30' and 30", which contact with connecting terminals 16, 16' and 16" at said camera main body B when the finder unit F is mounted on the camera main body B, are provided at said insulating plate 28 in such a manner that a head part of each of said terminals 30, 30', 30" is biased by conductive plate springs 31, 31', 31" to protrude outside the frame 25 for retaining contact.

The end parts of said plate springs 31, 31' and 31" are fixed at said insulating plate 28 by conductive screws 32, 32' and 32", respectively, and connecting wires 33, 33' and 33" are connected to said screws 32, 32' and 32", respectively.

An accessory shoe 35 is for mounting a known type of flash light device S (shown in FIG. 5) and requires a signal related to an operation of the shutter at the camera main body B, wherein said shoe 34 is fixed on a stand 36 which is made of insulating material attached to an upper part of the finder housing 24 by screws 35, 35'.

Two connecting terminals 37, 37' are so positioned in said insulating stand 36 that their heads protrude out of the stand, and are connected to the above mentioned connection terminals 30, 30" through the connecting wires 38, 38', respectively (as shown in FIG. 5).

Guide rails 39, 39' for mounting the finder unit correspond to the guide members 13, 13' on the camera main body B, wherein said rails 39, 39' are attached to left and right side surfaces of the frame 25 in such a manner as to fit into said guide grooves 13a, 13'a, respectively when the finder unit F is mounted on the camera main body B, so that the finder optical systems 21, 22 can be properly positioned with respect to the optical systems 8, 9 at the camera main body B.

Pressing members 40, 40' and 41, 41' are provided symmetrically on left and right side surfaces of the finder housing 24, being elastically pushed, respectively, by spring members (portions thereof are shown as 42 in FIG. 1) to elastically sandwich said the upper plate parts of said guide members 13, 13' provided on the camera body B between said rails 39, 39' as the finder unit F is mounted on the camera main body B.

Releasable locking members 43, 43' engage with the notched parts 13b, 13'b of said guide members 13, 13', respectively, provided on the camera main body B as the finder unit F is mounted on the camera main body B so that the finder unit F can be locked against the camera main body B. Locking members 43, 43' are provided at positions corresponding to said notched parts 13, 13', respectively, of the guide members, 13, 13' at left and right side surfaces of the finder housing 24.

Release buttons 44, 44' release the locking relationship established between the finder and the camera main body by the locking members 43, 43' as the finder unit F is demounted from the camera main body B, and are provided at left and right side surfaces of the finder housing 24 in communication with the locking members 43, 43'.

An ocular member 45 is provided in a rear portion of the finder housing 24.

Next, an explanation will be made of the details of the form of electrical connections between the above mentioned camera main body B and the finder unit F, the flash light device S, and the above mentioned data photo-taking circuit DC in the data photo-taking device provided at the finder unit F, referring to FIG. 5.

First the data photo-taking device provided at said finder unit F is activated by a signal relating to the operation of the shutter in the camera main body B. Therefore the data photo-taking circuit DC is connected to the above mentioned connection terminals 30, 30' through the connecting wires 33, 33'. Also shown is a power source E for said data photo-taking circuit DC. And said flash light device S is of a known design and has two connection terminals 46, 46', which will be connected to the connection terminals 37, 37', respectively, at the finder unit F when the flash light device S is attached to the above mentioned accessory shoe 34.

In the data photography circuit DC shown by broken lines in the drawing, R1 to R5 are resistances and C is a capacitor for establishing a time constant to define a period of time during which the lamp L is lighted. The capacitor C is connected to a voltage-dividing point of a bleeder circuit consisting of the resistances R1 and R2. The bleeder charge from said bleeder circuit begins to flow into said condensor C as the main switch SW3 is closed.

Also the connecting wires 33, 33' connected to the connecting terminals 30, 30' are connected to the data photography circuit DC to form the discharge circuit of the capacitor C together with said resistance R3 when the contacts of the synchronous switch SW1 at the camera main body B close.

What are shown as Tr1 and Tr2 are switching transistors that control the lighting cycle of the above mentioned lamp L, wherein the transistor Tr1 is connected to said capacitor C and has its switching action controlled by the charging and discharging of said capacitor C, while said transistor Tr2 is connected to the transistor Tr1 and has its switching action activated along with the switching of the transistor Tr1. Said lamp L is connected to the emitter side of said transistor Tr2 and has its Tighting cycle controlled by the switching of said transistor Tr2. Protective diodes D1 and D2 prevent the discharge current from said flash light device S from flowing into the data photo-taking circuit DC, and are connected to said connecting wires 33, 33'.

Next, explanations will be made concerning the function of the camera system consisting of the camera main body and the finder unit.

First, when the guide rails 39, 39' at the finder unit F are fitted into the guide grooves 13a, 13'a, respectively at the guide member 13, 13' of the camera main body B to mount the finder unit F onto the recessed part of the camera main body B, the locking members 43, 43' provided at the finder unit F fit into the notched parts 13b, 13'b, respectively, of the guide members 13, 13' and the finder unit F is locked against the camera main body B, and at a same time, the connection terminals 30, 30' and 30" at the finder unit F are elastically contacted with the connecting terminals 16, 16' and 16" at the camera main body B by the conductive plate springs 31, 31', 31", respectively, so that the data photo-taking circuit DC provided at the finder unit F is connected to the synchronous switch SW1 provided at the camera main body B, while the connection terminals 37, 37' provided at the stand 36 are connected to the series circuits of the switches SW1, SW2 respectively (a state shown in FIG. 5).

Next, when a film wind up and a shutter charging are done by operating the lever 19, the shutter charging gears 61, 62 are rotated by one rotation as has been explained above in reference to FIG. 3. Then the rotating drum 49 for the first curtain 7 and the rotating drum 53 for the second curtain 7' are rotated by two rotations through the gears 59, 60, respectively, by the toothed parts 61b, 62b of said gears 61, 62. Thus, the first curtain 7 and the second curtain 7' are set at their initial positions, and at a same time the springs in each of the spring drums 51, 55 are charged. Also at a time of this shutter charge, the synchronous switch SW1 returns to an open state as the gear 65 is rotated in a clockwise direction. Therefore, the pressing by its pin 65a is released. In addition the switch SW2 returns to a closed state as the gear 71 is rotated in a clockwise direction. Therefore the pressing by its pin 71a is released.

And at a time when shutter charge is completed, the first curtain checking lever 66 is engaged with the pin 65b affixed to an under surface of the gear 65 while the second curtain checking lever 72 is engaged with the pin 71b affixed to an under surface of the gear 71, respectively. Therefore, the rotating drum 49 for the first curtain 7 and the rotating drum 53 for the second curtain 7' will be checked and retained against the biasing power of the springs in the spring drums 51, 53 in a state where said springs are charged (a state shown in FIG. 3).

When a data sheet 26 is inserted through the opening 24a at the housing 24 of the finder unit F and the operating knob 27 provided on a side surface of said housing 24 is changed over to the "ON" position for data phototaking, the main switch SW3 of the data photo-taking circuit DC is closed thereby, and capacitor C starts charging through the resistance R1 in the data phototaking circuit DC. Also when the camera is in data photo-taking state the transistor Tr1 does not conduct as its emitter side has higher potential than that at its base side. Therefore, the transistor Tr2 does not conduct. Thus the lamp L remains off. And when the release button 20 is pressed down for taking a photograph after the charging of the capacitor C is completed, the first curtain checking lever 66 is rotated in a counterclockwise direction against the working power of the spring 68 by the release member 69 after the mirror 6 is positioned outside of the photo-taking optical path for exposure of the film 10, and the checking of the rotating drum 49 for the first curtain 7 is released. By this action, the spring drum 51 for the leader screen is rotated in a clockwise direction around the axle 52 by the working power of the spring provided within the same. Therefore, first, the first curtain 7 runs the a direction of an arrow in FIG. 3 and the aperture 78 for photo-taking is opened to initiate an exposure of the film 10. And when the first curtain 7 reaches its final point of running the gear 65 makes about ¾ rotations from its position shown in FIG. 3 in a counterclockwise direction. The synchronous switch SW1 is closed by the pin 65a on the gear 65 at that time.

When the synchronous switch SW1 at the camera main body is closed, a discharge circuit for the capacitor C, consisting of said switch SW1 and the resistance R3 is formed within the circuit shown in FIG. 5, and the electric charge accumulated in said capacitor C starts to discharge through a channel of the diode D1→the connecting terminals 30→16→the switch SW1→the connecting terminals 16'→30→the resistance R3. Thereby the base of the transistor Tr1 begins to have a higher potential than that its emitter. Therefore, the transistor Tr1 changes to a conductive state at the same time as the discharge of the capacitor C is started that is, in synchronism with the closing of the switch SW1. Therefore, the transistor Tr2 conducts and the lamp L is lighted, thus initiating data photography.

That is, when the lamp L is lights, an image of the data recorded in the data sheet 26 is formed by the lens 23 on the film 10 through the light guide members 11, 11' in the camera main body B. Thus, photography of data recorded in the data sheet 26 will be done.

When such length of time as set by the setting dial 18 from an initiation of the running of the first curtain 7 has elapsed, power is supplied to the coil 77 of the electromagnet Mg by a shutter control circuit not shown in the drawing. Thereby, said electro-magnet Mg attacts the armature 76 at the end of the second curtain checking lever 72, and is rotated in a clockwise direction against the working power of the spring 74. Therefore, the checking of the rotating drum 53 for the first curtain 7 will be released. By this action, the spring drum 55 for the second curtain 7' is rotated in a clockwise direction around the axle 56 by the working power of the spring provided within said drum 55. Therefore, the second curtain 7' will run in the direction of the arrow in FIG. 3.

And when the second curtain 7' reaches at its final point of running, the gear 71 makes about ¾ rotations from a position shown in FIG. 3 in a counter-clockwise direction. The switch SW2 will then be opened by the pin 71a on the gear 71.

And when the mirror 6 returns to the photo-taking optical path and the photo-taking is completed, also the discharging of the capacitor C is completed in the data photo-taking device. The transistor Tr1 is changed to a non-conductive state as its base-emitter will have same levels of potentials. Thereby the transistor Tr2 also becomes non-conductive, the lamp L is turned off and the photo-taking of data is completed.

Data photography will be done in the manner explained above. Also, the length of time that the lamp L is lighted during data photography will be defined based on a time constant expressed by $$C \cdot \frac{R_3 \cdot R_4}{R_3 + R_4}$$

by the capacitor C and the resistances R3 and R4. That is, the discharging time of the capacitor C through resistors R3, R4 of the above mentioned data photo-taking circuit DC.

On the other hand, when photo-taking is done using the flash light device S, said flash light device S is mounted on the accessory shoe 34 of the finder unit F. By this means, the connecting terminals 46, 46' in the flash light device S contact with the connecting terminals 37, 37', respectively on the accessory shoe 34 of the finder unit F. Therefore, said flash light device S will be connected to the series circuits of the above mentioned synchronous switches SW1 and SW2 provided in the camera main body B through the finder unit F, that is, through the connection terminals 46–37, 46'–37' and 30–16, 30"–16" (shown in FIG. 5). Thus, said flash light device is synchronized with the shutter in the camera main body B.

Also, as the flash light device S emits light, the discharging current generates a high voltage between the connecting terminals 46, 46'. The flow of said discharging currrent into the data photo-taking circuit DC will be prevented by the diodes D1, D2. Therefore, damage to the data photo-taking circuit DC by the discharge current from the flash light device S in flash light photography, or the erroneous operation of said data phototaking circuit DC in data photography can be prevented. Also even if the discharging path of the flash light device S is opened as the switch SW2 is opened at the completion of photo-taking, the charging of the flash light device S for light emission is completed if the film wind up and the shutter charge are not complete (that is in a state where the switch SW1 is closed), accidental light emission can be prevented.

While the electrical connection between the camera main body B and the view finder unit F in the above example is secured by butting contacts of the contacts, 16–30, 16'–30', 16"–30", different forms of said electrical connection are also suitable such as a so-called "plug-in" type. Therefore explanations will be made of an example in which a so-called "plug-in" type connection is employed referring to FIG. 6. In said drawing components identified with the same numbers and symbols as used in the above mentioned example are identical to those mentioned above.

First, what is shown as 81 in the camera main body B is an insulated base fixed to the camera frame 1 in place of the above mentioned insulated plate 14, having three holes 81a, 81b and 81c, into each one of which conductive elastic contacting pieces 79, 79', 79" for receiving plugs, are inserted. What are shown as 80, 80', 80" are conductive screws for fixing contacting pieces. The above mentioned connecting wires 17, 17' and 17" are connected to said screws 80, 80' and 80" respectively. An insulating cover plate 82 has three receptacle holes for plugs and is so fixed by adhesives, etc. at said base 81 that each one of said receptacle holes matches with the holes 81a, 81b, 81c respectively at said base 81.

What is shown as 84 in the finder unit F is an insulating plate fixed at a front lower part of the housing 24 in place of the above mentioned insulating plate 28. Three plug-pins, 83, 83' and 83" corresponding to said contacting pieces 79, 79' and 79" respectively on the camera main body B are embedded in said insulating plate 84. Also the connecting wires 33, 33' and 33" are connected to ends of said plug-pins 83, 83' and 83", respectively.

When the finder unit F is mounted on the camera main body B by the above mentioned procedure in this embodiment, the plug-pins 83, 83' and 83" of the finder unit F go into the holes 81a, 81b and 81c respectively in the insulated base 81 of the camera main body B, contacting the contacting pieces 79, 79' and 79" for receiving plugs, respectively, in each hole, and by such arrangement a more secure electrical connection between the camera main body B and the finder unit F can be accomplished than by the butting contact of the contacting pieces in the preceeding example.

While explanations have been made on an example of a case when a view finder unit is made as an adapter unit which can be freely mounted to and demounted from a camera main body for systemization of a camera, the electrical connection between a camera main body and a view finder unit can be secured basically in a same manner as in the case of said example in a case when a view finder unit is made as a unit against a camera main body and is connected to the camera main body at a final stage or in the course of an efficient camera assembly process for a camera that is not systemized.

As has been explained above in detail, the present invention has such features that connecting means are provided in a view finder unit being made as a unit against a camera main body in a manner such that it is capable of being connected to electrical means provided in the camera main body for generating signals related to the operation of a shutter device as the finder unit is coupled to the camera main body. The electrical signals can thereby be supplied to a device which can have its operation controlled by the electrical signals that is for example, a data photography device or a flash light device, etc., through a connecting means provided on said finder unit. Therefore, the electrical connections of such synchronous device installed on a finder of a camera can be accomplished with very high efficiency. In addition a pattern of a view finder adapter unit which is quite useful in systemization of a camera can be provided.

And said synchronous device can be provided on a finder unit, with the electrical connections between said synchronous device and the camera main body accomplished in a surer manner, without any need of connecting cords, etc., which have been extensively used heretofore. Such connecting cords constitute big obstacles in handling a camera, and sometimes become dislocated during photography and said synchronous device provided at the finder unit can thereby be totally disabled.

While said example of the present invention pertains to a finder unit having both a data photo-taking device and an accessory shoe to attach a flash light device, a finder unit can naturally be of a type only having either one of the same.

What is claimed is:

1. In a single lens reflex camera, a combination comprising:
   (a) a lens system for forming an image of an object, said lens system having an optical axis;
   (b) a camera body housing having a first and second opening;
   (c) first mounting means adapted for mounting the lens system on the camera body housing, said first mounting means being provided near said first opening;
   said lens system, when attached to the camera body housing through said first mounting means, being capable of forming the object image on a film within the camera body housing through the first opening;
   (d) movable mirror means disposed within the camera body housing and movable between a first position at which the mirror means deflects light coming through the lens system to said second opening and a second position at which the mirror means closes the second opening;
   the optical axis of the lens system being directed to the second opening by the mirror means when the mirror means is set to the first position;
   (e) a view finder unit housing removably attachable to the camera body housing, said unit housing being provided with a third opening corresponding to the second opening of the camera body housing and being provided with a fourth opening;
   (f) view finder optical means adapted for viewing the object image to be formed on the film by the lens system, through said fourth opening, said optical means being disposed within the view finder unit housing and having an optical axis projecting through said third opening of the unit housing;
   (g) second mounting means adapted for mounting the view finder unit housing on the camera body housing, said second mounting means being provided near said second opening of the camera body housing and having guide means being substantially parallel to the optical axis of the lens system;
   (h) engageable means corresponding to said guide means, said engageable means being provided on the view finder unit housing and engageable with the guide means for attaching the unit housing to the camera body housing;

said view finder unit housing being attachable to the camera body housing through the engagement of the engageable means with the guide means by sliding the unit housing from the rear side of the camera body housing to the front side of the camera body housing along a direction substantially parallel to the optical axis of the lens system;

(i) first electrical terminal means disposed in the vicinity of said second opening of the camera body housing and in a position confronting the direction in which said view finder unit housing is mounted;

(j) second electrical terminal means provided on a part of said view finder unit housing for contacting with said first terminal means when the view finder unit housing is attached to the camera body housing, said second terminal means being disposed in a position to confront said first terminal means when the view finder unit housing is attached to said camera body housing;

(k) urging means for retaining contact between said first and second terminal means when the view finder unit housing is attached to the camera body housing, said urging means being arranged to urge at least one of the first and second terminal means against the other for retaining the first and second terminal means in contact with each other when the view finder unit housing is attached to the camera body housing;

with said view finder unit housing attached to said camera body housing, said urging means is arranged to exert an urging force on said view finder unit housing in the direction opposite to the direction in which said view finder unit housing is attached to the camera body housing; and (l) releasable latching means provided between said view finder unit housing and said camera body housing for firmly fixing said view finder unit housing to said camera body housing in a manually releasable manner, said latching means being provided with aligning means for aligning said view finder unit housing with said camera body housing through the urging force of said urging means to have the optical axis of the view finder optical means, which projects through the third opening of said view finder unit housing, aligned with the optical axis of said lens system which is directed to the second opening of said camera body housing by mirror means when said mirror means is in the first position thereof.

2. The combination according to claim 1, wherein said urging means is provided on said view finder unit housing for causing said second terminal means to impinge upon said first terminal means.

3. The combination according to claim 2, further comprising:

first insulating terminal supporting means provided on the camera body housing;

said first terminal means being fixedly supported by said first supporting means; and second insulating terminal supporting means provided on the view finder unit housing;

said second terminal means being movably supported by said second supporting means and being urged by said urging means so as to impinge upon the first terminal means.

4. The combination according to claim 3, wherein said first terminal means includes a plurality of first contact members fixedly supported by said first supporting means; and said second terminal means includes a plurality of second contact members for contacting with each of said first contact members respectively, said second contact members being movably supported by said second supporting means and being urged by said urging means so as to impinge upon each of the first contact members respectively.

5. The combination according to claim 4, wherein said urging means includes a plurality of urging members for retaining the contact of each of said second contact members with each of said first contact members, each of said urging members being installed on said second supporting means and urging each of the second contact members so as to impinge upon each of the first contact members respectively.

6. The combination according to claim 1, wherein said latching means includes:

a pair of first engaging portions adapted for firmly fixing the view finder unit housing to said camera body housing, said first engaging portions being disposed on a part of the guide means of said second mounting means and being respectively provided with first aligning faces which form a part of said aligning means; and a pair of manually operable latching members disposed on said view finder unit housing, each of said latching members having a second engaging portion for engaging with each of said first engaging portions to firmly fix said view finder unit housing to said camera body housing, each of said second engaging portions being provided with a second aligning face which is arranged to be caused by the urging force of said urging means to engage with each of said first aligning face for bringing said view finder unit housing in alignment with said camera body housing in such a way as to have the optical axis of the view finder optical means, which projects through the third opening of the view finder unit housing, aligned with the optical axis of said lens system which is directed to the second opening of said camera body housing by mirror means when said mirror means is set in the first position thereof, each of said second aligning faces being arranged to form a part of said aligning means.

7. The combination according to claim 1, further comprising:

shutter means disposed within the camera body housing for exposing the film to the light coming through the lens system; and synchronous signal generating means disposed within the camera body housing for providing a synchronous signal related to the operation of said shutter device;

said first terminal means being electrically connected with said signal generating means.

8. The combination according to claim 1, further comprising:

third mounting means provided on the view finder unit housing and adapted for mounting a synchronous device, which is operable in synchronism with the operation of said shutter means in response to said synchronous signal provided by said synchronous signal generating means; and third electrical terminal means provided near said third mounting means for electrically connecting with said synchronous device when the synchronous device is attached to the view finder unit housing through said third mounting means, said third terminal means being electrically connected with said second terminal means.

9. The combination according to claim 8, wherein said synchronous device is a flash device for emitting a flash light in synchronism with the operation of said shutter device in response to said synchronous signal, and said third mounting means is constructed as an accessory shoe means for mounting the flash device.

10. The combination according to claim 9, further comprising a secondary synchronous device disposed within said view finder unit housing and operable in synchronism with the operation of said shutter device in response to said synchronous signal provided by said synchronous signal generating means, said secondary device being electrically connected with said second terminal means.

11. The combination according to claim 10, wherein said secondary synchronous device provided in the view finder unit housing is a data photographing device for photographing data on the film in synchronism with the operation of the shutter device in response to said synchronous signal.

12. The combination according to claim 11, wherein said data photographing device comprises:
a data source having data to be photographed into said film;
light emitting means for providing light beams onto said data source, said light emitting means being electrically connected to said second terminal means for emitting light in response to said synchronous signal provided by said synchronous signal generating means;
image forming optical means for forming images of said data to be photographed onto said film in response to the data light beams provided by said data source as said light emitting means emits light; and first light conducting means for guiding the data image formed by said image forming optical means toward the camera body unit; and
wherein said combination further comprises a second light conducting means for guiding the data-image, which has been guided by said first light conducting means, further to the film, said second light conducting means being disposed within said camera body housing and being aligned optically with said first light conducting means when said view finder unit housing is attached to the camera body housing.

13. The combination according to claim 12, wherein said data photographing device further comprises electrical means for preventing an electrical current generated by said flash device from flowing to said light emitting means through said third and second terminal means when said flash device operates, said light emitting means being connected to said second terminal means through said electrical means.

14. The combination according to claim 8, wherein said urging means is provided on said view finder unit housing for causing said second terminal means to impinge upon said first terminal means.

15. The combination according to claim 14, further comprising:
first insulating terminal supporting means provided on the camera body housing;
said first terminal means being fixedly supported by said first supporting means; and
second insulating terminal supporting means provided on the view finder unit housing;
said second terminal means being movably supported by said second supporting means and being urged by said urging means so as to impinge upon the first terminal means.

16. The combination according to claim 15, wherein said urging means is electrically conductive elastic means being installed on said second supporting means and being in contact with said second terminal means for urging the second terminal means, said third terminal means being electrically connected to the second terminal means through said urging means.

* * * * *